(12) United States Patent
Ding

(10) Patent No.: US 9,819,820 B2
(45) Date of Patent: Nov. 14, 2017

(54) CHIP, IMAGING CARTRIDGE, AND COMMUNICATION METHOD BETWEEN THE CHIP AND IMAGING DEVICE

(71) Applicant: APEX MICROELECTRONICS CO., LTD, Zhuhai (CN)

(72) Inventor: Li Ding, Zhuhai (CN)

(73) Assignee: APEX MICROELECTRONICS CO., LTD, Zhuhai (CN)

( * ) Notice: Subject to any disclaimer, the term of this patent is extended or adjusted under 35 U.S.C. 154(b) by 0 days.

(21) Appl. No.: 15/073,317

(22) Filed: Mar. 17, 2016

(65) Prior Publication Data

US 2016/0198058 A1 Jul. 7, 2016

Related U.S. Application Data

(63) Continuation of application No. PCT/CN2014/075637, filed on Apr. 17, 2014.

(30) Foreign Application Priority Data

Sep. 24, 2013 (CN) .......................... 2013 1 0439993

(51) Int. Cl.
*G03G 21/18* (2006.01)
*H04N 1/00* (2006.01)
(Continued)

(52) U.S. Cl.
CPC ........ *H04N 1/00832* (2013.01); *B41J 29/393* (2013.01); *G03G 15/50* (2013.01);
(Continued)

(58) Field of Classification Search
None
See application file for complete search history.

(56) References Cited

U.S. PATENT DOCUMENTS 7,234,645 B2 *  6/2007  Silverbrook ............... B41J 2/14
                                                              235/454
8,718,495 B2 *  5/2014  Chihara ............. G03G 21/1882
                                                              399/24
(Continued)

FOREIGN PATENT DOCUMENTS

CN        101954797 A      1/2011
CN        201745246 U      2/2011
(Continued)

OTHER PUBLICATIONS

The World Intellectual Property Organization (WIPO) International Search Report for PCT/CN2014/075637 dated Jul. 30, 2014.

*Primary Examiner* — Barbara Reinier
(74) *Attorney, Agent, or Firm* — Anova Law Group, PLLC

(57) ABSTRACT

A communication method is provided between a chip and an imaging device. Accordingly, the chip receives a clock pulse signal from the imaging device via a clock line; and receives a READ instruction from the imaging device via a data line. Within one clock pulse signal period, the chip transmits at least one bit of implicit data and one bit of master data that are stored in an internal memory to the data line within different time slots, respectively, and the imaging device collects data from the data line while the chip is transmitting the master data to the data line. Further, the chip receives a WRITE instruction from the imaging device via the data line, wherein the chip receives master data sent from the imaging device, writes the master data into the memory arranged in the chip, and updates the implicit data stored in the memory.

15 Claims, 4 Drawing Sheets

(51) Int. Cl.
*B41J 29/393* (2006.01)
*G03G 15/00* (2006.01)

(52) U.S. Cl.
CPC ..... *G03G 21/1878* (2013.01); *G03G 21/1882* (2013.01); *H04N 1/0009* (2013.01); *H04N 1/00538* (2013.01)

(56) References Cited

U.S. PATENT DOCUMENTS

| | | | | |
|---|---|---|---|---|
| 2007/0206076 A1* | 9/2007 | Seino | ................... | B41J 2/17503 347/86 |
| 2008/0240745 A1* | 10/2008 | Hibino | ................. | G03G 15/553 399/24 |
| 2014/0355366 A1* | 12/2014 | Gay | ....................... | G11C 7/222 365/193 |

FOREIGN PATENT DOCUMENTS

| | | | |
|---|---|---|---|
| CN | 102765256 A | 11/2012 | |
| CN | 103501398 A | 1/2014 | |

* cited by examiner

CHIP, IMAGING CARTRIDGE, AND COMMUNICATION METHOD BETWEEN THE CHIP AND IMAGING DEVICE

CROSS-REFERENCE TO RELATED APPLICATIONS

This application is a continuation of PCT Patent Application No. PCT/CN2014/075637, filed Apr. 17, 2014, which claims the priority benefit of Chinese Patent Application No. 201310439993.8, filed on Sep. 24, 2013. The contents of the above identified applications are incorporated herein by reference in their entireties.

FIELD OF THE INVENTION

The present disclosure relates to imaging and developing technologies, and in particular, to a chip, an imaging cartridge, and a communication method between the chip and an imaging device.

BACKGROUND OF THE INVENTION

As the imaging technology develops, imaging devices such as photocopiers, printers, fax machines, and word processors are widely used in various fields. Such an imaging device is commonly provided with a removable imaging cartridge (such as an ink cartridge and a toner cartridge) for accommodating recording materials, and the imaging cartridge is generally provided with a chip. The chip is stored with invariable data relevant to the imaging cartridge, and variable data generated in a printing procedure, wherein the invariable data can be manufacturer code, date of manufacture, model, characteristic parameters, and the like, while the variable data can be imaging pages, remaining amount of recording materials, revolutions of a rotating unit, and the like. The rotating unit herein can be a core component used in an imaging operation, such as an OPC drum, a primary charge roller, a developer roller, and a supply roller. In a communication procedure between the imaging device and the chip, the imaging device will read the data stored in the chip or update the data stored in the chip.

When the chip is mounted into the imaging device, a communication interface of the chip will be electrically connected to a contact terminal of the imaging device, to form a communication line, which includes a clock line CLK for transmission of clock pulse signals, and a data line DAT for transmitting data under the action of the clock pulse signals. The data line DAT is a bidirectional data transmission line, such that data can be transmitted either from the imaging device to the chip via the data line, or from the chip to the imaging device via the data line. The clock line CLK is a unidirectional signal transmission line, wherein the clock pulse signals being transmitted are usually under the control of the imaging device, so that the imaging device and the chip act synchronously. FIG. 1 shows a communication procedure in which the imaging device reads data stored in the chip. At a rising edge A of a first clock pulse signal, the chip will transmit a first datum 1 to the data line (i.e., the chip will transmit a high level signal to the data line). And at a falling edge B of the first clock pulse signal, the imaging device will read the datum 1 from the data line. At a rising edge C of a second clock pulse signal, the chip will transmit a second datum 0 to the data line (i.e., the chip will transmit a low level signal to the data line). And at a falling edge D of the second clock pulse signal, the imaging device will read the datum 0 from the data line. As such, the chip will transmit one datum to the data line at each of points E, G, I, K, and M, and the imaging device will read the data from the data line at points F, H, J, L, and N. In the end, the chip will transmit the data 10110100 to the imaging device. Likewise, FIG. 1 can also show a communication procedure in which the imaging device writes data into the chip. At the rising edge A of the first clock pulse signal, the imaging device will transmit the first datum 1 onto the data line (i.e., the imaging device will transmit a high level signal to the data line). And at the falling edge B of the first clock pulse signal, the chip will read the datum 1 from the data line. At the rising edge C of the second clock pulse signal, the imaging device will transmit the second datum 0 onto the data line (i.e., the imaging device will transmit a low level signal to the data line). And at the falling edge D of the second clock pulse signal, the chip will read the datum 0 from the data line. As such, the imaging device will transmit one datum to the data line at each of points E, G, I, K, and M, and the chip will read the data from the data line at points F, H, J, L, and N. In the end, the imaging device will transmit the data 10110100 to the chip.

Although the above communication procedures are simple and easy to perform, they are incapable of satisfying people's increasing demands. For example, customers may expect to know about more information, such as anti-counterfeit information and manufacturing information of the chip. And suppliers or manufacturers of the chip may seek to know the working environment, users' mis-operation conditions, usage states of the chip, and the like. Where abnormality arises, the reasons thereof can be readily found out according to the above information. CN 201210209303.5 discloses a chip stored with parameter values of usage states of the chip, comprising at least one selected from a group consisting of WRITE times, normal communication times, READ times, communication failure times, and communication interference times. When the chip receives a READ/WRITE operation command from an imaging device, or when a control unit of the chip monitors a communication interference signal, the chip will automatically update the parameter value of the usage state thereof. When the chip fails, if the supplier or manufacturer, through reading the parameter value of the usage state of the chip, learns that the chip fails after being used for only a limited number of times, it can be concluded that the failure is largely due to performance deficiency of the chip. On the contrary, if the chip has been used for many times, it can then be concluded that the failure might due to an end of the service life of the chip. Information similar to the parameter value of the usage state as described above can be generally termed as implicit data. Although an existing chip has been stored with these implicit data, an existing imaging device generally does not support a READ/WRITE operation thereof. The chip has to be removed from the imaging device and mounted to an additional information reading device, which can simulate a command of the imaging device and read the implicit data from the chip. Even if there might exist a small number of imaging devices that can support a READ/WRITE operation of these implicit data, such an operation should be based on the traditional communication procedure as indicated in FIG. 1, wherein an additional data reading command is necessary during the communication between the imaging device and the chip for the READ/WRITE operation of the implicit data. However, such an additional READ/WRITE operation will inevitably prolong communication time between the imaging device and the chip, which is against rapid start and response of the imaging device, thereby reducing imaging efficiency.

As a result, there is an urgent need of a chip which is capable of outputting the implicit data without disturbing normal communication between the imaging device and the chip, an imaging device that can cooperate with such a chip, and a corresponding communication method.

SUMMARY OF THE INVENTION

In order to solve the above problem, the present disclosure provides a chip, an imaging cartridge, and a communication method between the chip and an imaging device, wherein the chip can output implicit data without affecting normal communications between the imaging device and the chip.

The present disclosure provides a communication method between a chip and an imaging device, comprising the steps of:

receiving, by the chip, a clock pulse signal from the imaging device via a clock line;

receiving, by the chip, a READ instruction from the imaging device via a data line, wherein within one clock pulse signal period, the chip transmits at least one bit of implicit data and one bit of master data that are stored in an internal memory to the data line within different time slots, respectively, and the imaging device collects data from the data line while the chip is transmitting the master data to the data line; and receiving, by the chip, a WRITE instruction from the imaging device via the data line, wherein the chip receives the master data sent from the imaging device, writes the master data into the memory arranged in the chip, and updates the implicit data stored in the memory.

According to an embodiment of the present disclosure, in the above communication method, after a rising edge of the clock pulse signal arrives, the chip transmits at least one bit of implicit data to the data line, and before a falling edge of the clock pulse signal arrives, the chip stops such transmission of the implicit data, and turns to transmit one bit of master data to the data line; and when the falling edge of the clock pulse signal arrives, the imaging device collects data from the data line.

Alternatively, after the falling edge of the clock pulse signal arrives, the chip transmits at least one bit of implicit data to the data line, and before the rising edge of the clock pulse signal arrives, the chip stops such transmission of the implicit data, and turns to transmit one bit of master data to the data line; and when the rising edge of the clock pulse signal arrives, the imaging device collects data from the data line.

Besides, in the above communication method, the imaging device can further collect data from the data line in the time slot when the chip is transmitting the implicit data to the data line.

The above implicit data of the chip comprise at least one selected from a group including parameters of anti-counterfeit information, manufacturing information, WRITE times, restoration times, normal communication times, READ times, communication failure times, communication interference times, and working environment of the chip.

In addition, in the above communication method, when receiving the WRITE instruction from the imaging device via the data line, the chip can first update the implicit data stored in the memory, and then write the master data received from the imaging device into the memory.

According to an embodiment of the present disclosure, the master data are transmitted to the data line in the forms of a high-level voltage and a low-level voltage, respectively; and the implicit data are transmitted to the data line in the forms of a high-level voltage and a low-level voltage, respectively, or alternatively in the forms of a high-level voltage and a mid-level voltage, respectively, wherein the mid-level voltage is lower than the high-level voltage and higher than the low-level voltage.

Moreover, the present disclosure also provides a chip, wherein data transmission can be performed between the chip and the imaging device through the above communication method.

Furthermore, the above chip can comprise:

a memory used for storing the implicit data and the master data; and a control unit used for connecting the imaging device via a bus and transmitting data to the bus, wherein controlled by the control unit, the chip receives the clock pulse signal and the READ instruction from the imaging device via the bus, and transmits, within one clock pulse signal period, at least one bit of implicit data and one bit of master data that are stored in the memory to the bus in different time slots, respectively, and wherein the control unit is provided with a timing module therein, under the control of which, the chip transmits the master data to the bus while the imaging device is collecting data from the bus.

Finally, the present disclosure further provides an imaging cartridge provided thereon with the above chip.

Compared with the prior art, the present disclosure provides the chip, the imaging cartridge, and the communication method between the chip and the imaging device that can achieve transmission of the implicit data and the master data on one and a same data line. The imaging device can read the master data only, or can read the implicit data also, by means of an information reading device having a function of reading implicit data, while the chip is transmitting the implicit data, thereby ensuring both data transmission efficiency and data security of the implicit data.

The purpose and other advantages of the present disclosure can be achieved and obtained through the structures as specially indicated in the description, the claim set, and the accompany drawings.

BRIEF DESCRIPTION OF THE DRAWINGS

The drawings are provided for further understanding of the present disclosure, and constitute one part of the description. They serve to explain the present disclosure in conjunction with the embodiments, rather than to limit the present disclosure in any manner. In the drawings.

DETAILED DESCRIPTION OF THE EMBODIMENTS

Figure 1:
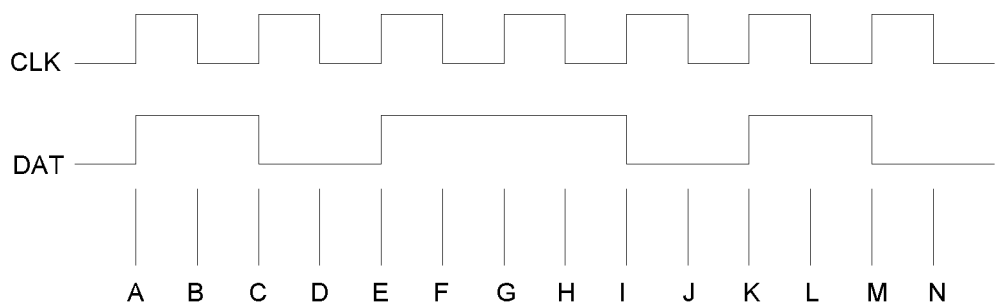
FIG. 1 shows a procedure of data transmission between an imaging device and a chip in the prior art.
Figure 2:
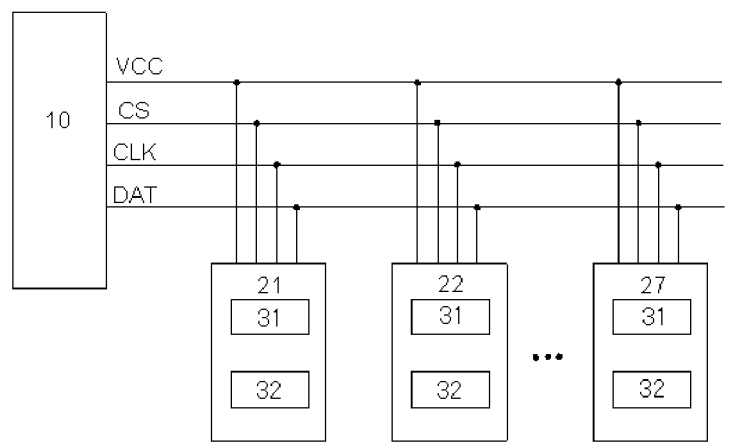
FIG. 2 shows a connection principle diagram between an electronic module of a chip and a controller of an imaging device according to the present disclosure.

FIG. 2 shows a connection principle diagram between an electronic module of a chip and a controller of an imaging device according to the present disclosure. As indicated in FIG. 2, the imaging device can be provided with a controller 10 therein, which can, via a bus, communicate with electronic modules 21, 22 . . . , 27, and the like, of a plurality of imaging cartridge chips. The bus can comprise a power supply line VCC, a chip selection line CS, a clock line CLK, and a data line DAT, and each of the electronic modules 21, 22 . . . , and 27 can be electrically connected to the bus, so as to receive power from the imaging device and to perform various signal transmission with the imaging device. Each of the electronic modules 21, 22 . . . , and 27 can be provided with a control unit 31 and a memory 32, wherein the control unit 31 can receive a signal sent from the controller 10 of the imaging device, and execute a corresponding operation as per the signal received. For example, in accordance with a READ/WRITE instruction sent by the controller 10 of the imaging device, the control unit 31 will read data stored in the memory 32, and transmit the data to the imaging device, or write data from the imaging device into the memory 32. The memory 32 can be stored with master data therein used for communicating with the imaging device, and implicit data that can be output and transmitted to the imaging device along with the master data, wherein the implicit data are stored and updated by the chip, rather than being written in by the imaging device.

When the imaging device sends the READ instruction, the chip will transmit the master data and the implicit data to the data line DAT, and the imaging device can read either the master data solely, or the master data and the implicit data together. When the imaging device sends the WRITE instruction, the imaging device will transmit the master data to the chip, which will update the implicit data stored therein, and store the master data received into the memory. The master data refer to information relevant to the imaging cartridge and an imaging procedure, and specifically can be either invariable data relevant to the imaging cartridge including manufacturer code, date of manufacture, model, characteristic parameters, date of first mounting, and the like thereof, or variable data relevant to the imaging procedure, including imaging pages, remaining amount of recording materials, revolutions of a rotating unit, and the like. The implicit data are stored and updated by the chip, rather than being written in by the imaging device, and therefore record information relevant to the chip per se. Specifically, the implicit data can be at least one selected from a group consisting of anti-counterfeit information of the chip, manufacturing information of the chip, usage parameters of the chip, and working environment parameters of the chip, wherein usage parameters of the chip can be at least one selected from a group consisting of parameter values of WRITE times, restoration times, normal communication times, READ times, communication failure times, and communication interference times. Of course, the master data and the implicit data can be expanded and changed as required by users on the above basis. Functions and configurations of the chip and the imaging device can be expanded and changed also. For example, the chip can be arranged either on the imaging cartridge or on the imaging device. Any modifications and variations made to the implementation forms and details of the technical solution of the present disclosure all fall in the scope of the present disclosure, as long as they do not extend the spirit of the present disclosure.

Figure 3:
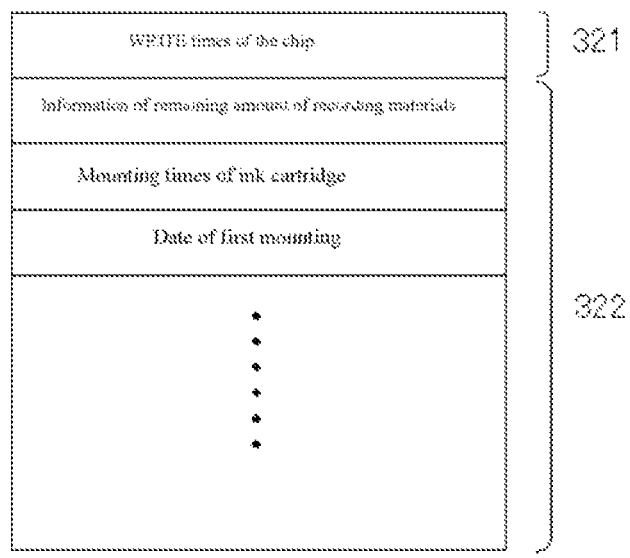
FIG. 3 schematically shows a storage structure of a memory of the chip according to the present disclosure.

FIG. 3 schematically shows a storage structure of the memory 32 of the chip according to the present disclosure, wherein the memory 32 can comprise a first storage unit 321 used for storing the implicit data, and a second storage unit 322 used for storing the master data. For instance, the first storage unit 321 can be stored with the parameter value of WRITE times of the chip, while the second storage unit 322 can be stored with the remaining amount of recording materials, mounting times of an ink cartridge, date of first mounting, and the like.

When the chip receives the READ instruction from the imaging device, the control unit 31 of the chip can receive a clock pulse signal from the clock line CLK, and alternately transmit the implicit data stored in the first storage unit 321 and the master data stored in the second storage unit 322 to the data line DAT by bits, at a transmission frequency of one bit of implicit datum and one bit of master datum per clock period.

When the chip receives the WRITE instruction from the imaging device, the control unit 31 of the chip will execute the following steps.

In an update step, the implicit data stored in the first storage unit 321 are updated. For example, when the parameter value of WRITE times stored in the first storage unit 321 is to be updated, the parameter value of WRITE times will be added with one or reduced by one.

In a WRITE step, the chip receives the master data from the imaging device via the data line DAT, and writes the master data into a corresponding position in the second storage unit 322.

Either the update step or the WRITE step above can be executed first by the control unit 31 of the chip. In the embodiment of the present disclosure, the update step is preferably executed before the WRITE step.

When the chip alternately sends the implicit data and the master data, the alternating time points can be controlled by a timing module (not shown in the drawings) arranged in the control unit of the chip.

The above electronic module of the chip can communicate with the imaging device through a chip interface unit, which can be an electric contact arranged on a substrate of the chip. When the chip is mounted into the imaging device, the electric contact on the substrate of the chip will be electrically connected to a contact terminal of the imaging device, so as to be connected to the bus. Alternatively, the interface unit can be antenna in wireless communication with the imaging device, which will not be limited herein.

Figure 4:
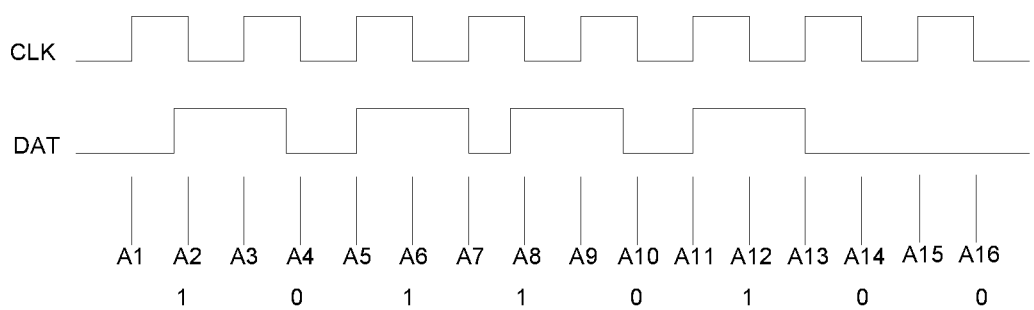
FIG. 4 shows a procedure diagram in which the chip transmits data to the imaging device according to an embodiment of the present disclosure.

In the following, a procedure in which the chip alternately transmits the implicit data and the master data to the imaging device will be illustrated in detail. FIG. 4 shows a procedure diagram in which the chip transmits data to the imaging device according to an embodiment of the present disclosure. In the embodiment as shown in FIG. 4, the master data and the implicit data are being transmitted in the data line DAT in the forms of high- and low-level voltages, wherein the high-level voltage corresponds to the datum "1" in the binary system, while the low-level voltage corresponds to the datum "0" in the binary system. Herein, the high-level voltage reaches approximately 3.3 V, and the low-level voltage generally equals a grounding voltage. The values of the high- and low-level voltages are of course not limited hereto.

When the imaging device sends the READ instruction to the chip, the chip will receive the clock pulse signal from the clock line CLK, and alternately transmit the implicit data and the master data to the data line DAT by bits. Generally, the amount of the master data will be much larger than that of the implicit data stored in the chip. As a result, after the implicit data are completely transmitted, the data line DAT will continue the transmission of the master data. This will be demonstrated with an example in the following. It can be assumed that the implicit data stored in the chip are "01101100," indicating WRITE times of the chip by the imaging device, while the master data are "10110100 . . . ," which indicate information of ink amount. As shown in FIG. 4, when the chip receives the READ instruction from the imaging device, it will transmit the first implicit datum "0" to the data line DAT at a rising edge A1 of a first clock pulse signal (i.e., a low-level signal will be transmitted to the data line DAT). Then, prior to arrival of a falling edge of the first clock pulse signal, the transmission of the first implicit datum will stop, and the first master datum "1" will be transmitted to the data line DAT (i.e., a high-level signal will be transmitted to the data line DAT). When the falling edge A2 of the first clock pulse signal arrives, the imaging device will read data from the data line DAT, to obtain the first master datum "1." At a rising edge A3 of a second clock pulse signal, the chip will transmit the second implicit datum "1" to the data line DAT (i.e., a high-level signal will be transmitted to the data line DAT). Then, prior to arrival of a falling edge of the second clock pulse signal, the transmission of the second implicit datum will stop, and the second master datum "0" will be transmitted to the data line DAT (i.e., a low-level signal will be transmitted to the data line DAT). When the falling edge A4 of the second clock pulse signal arrives, the imaging device will read data from the data line DAT, to obtain the second master datum "0." At a rising edge A5 of a third clock pulse signal, the chip will transmit the third implicit datum "1" to the data line DAT (i.e., a high-level signal will be transmitted to the data line DAT). Then, prior to arrival of a falling edge of the third clock pulse signal, the transmission of the third implicit datum will stop, and the third master datum "1" will be transmitted to the data line DAT (i.e., a high-level signal will be transmitted to the data line DAT). When the falling edge A6 of the third clock pulse signal arrives, the imaging device will read data from the data line DAT, to obtain the third master datum "1." As such, at the rising edges of the clock pulse signals, the chip will transmit the implicit data onto the data line DAT, while prior to arrival the falling edges of the clock pulse signals, the transmission of the implicit data will stop, and the master data will be transmitted to the data line DAT. When the falling edges of the clock pulse signals arrive, the imaging device will read the data from the data line DAT, so as to obtain the master data, until the implicit data are completely transmitted.

Figure 5:
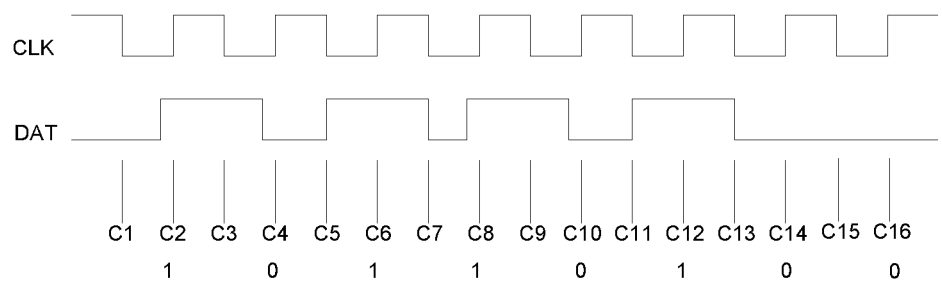
FIG. 5 shows a procedure diagram in which the chip transmits data to another imaging device according to an embodiment of the present disclosure.

Certainly, in connection with different imaging devices, the time when the chip transmits data to the data line DAT can be adjusted accordingly. FIG. 5 shows a procedure diagram in which the chip transmits data to another imaging device, which is different from the imaging device of the embodiment as shown in FIG. 4, and will read data from the data line DAT at rising edges of the clock pulse signals. Therefore, when the chip receives the READ instruction from the imaging device, it will transmit the first implicit datum "0" to the data line DAT at a falling edge C1 of the first clock pulse signal (i.e., a low-level signal will be transmitted to the data line DAT). Then, prior to arrival of a rising edge of the first clock pulse signal, the transmission of the first implicit datum will stop, and the first master datum "1" will be transmitted to the data line DAT (i.e., a high-level signal will be transmitted to the data line DAT). When the rising edge C2 of the first clock pulse signal arrives, the imaging device will read data from the data line DAT, to obtain the first master datum "1." At a falling edge C3 of the second clock pulse signal, the chip will transmit the second implicit datum "1" to the data line DAT (i.e., a high-level signal will be transmitted to the data line DAT). Then, prior to arrival of a falling edge of the second clock pulse signal, the transmission of the second implicit datum will stop, and the second master datum "0" will be transmitted to the data line DAT (i.e., a low-level signal will be transmitted to the data line DAT). When the rising edge C4 of the second clock pulse signal arrives, the imaging device will read data from the data line DAT, to obtain the second master datum "0." At a falling edge C5 of the third clock pulse signal, the chip will transmit the third implicit datum "1" to the data line DAT (i.e., a high-level signal will be transmitted to the data line DAT). Then, prior to arrival of a rising edge of the third clock pulse signal, the transmission of the third implicit datum will stop, and the third master datum "1" will be transmitted to the data line DAT (i.e., a high-level signal will be transmitted to the data line DAT). When the rising edge C6 of the third clock pulse signal arrives, the imaging device will read data from the data line DAT, to obtain the third master datum "1." As such, at the falling edges of the clock pulse signals, the chip will transmit the implicit data onto the data line DAT, while prior to arrival the rising edges of the clock pulse signals, the transmission of the implicit data will stop, and the master data will be transmitted to the data line DAT. When the rising edges of the clock pulse signals arrive, the imaging device will read the data from the data line DAT, to obtain the master data, until the implicit data are completely transmitted.

Since there is generally a much larger amount of master data than the implicit data to be read by the imaging device, after the implicit data are completely transmitted, the data line will continue the transmission of the master data to be read by the imaging device. After the implicit data are completely transmitted, the chip can either transmit the remaining master data bit by bit to the data line at the rising edges of clock pulse signals, followed by collection of said remaining master data by the imaging device at arrival of falling edges of the clock pulse signals, or alternatively transmit the remaining master data bit by bit to the data line prior to arrival of the falling edges of the clock pulse signals, followed by collection of said remaining master data by the imaging device at arrival of the falling edges of the clock pulse signals, until the master data to be read by the imaging device are transmitted completely.

Figure 6:
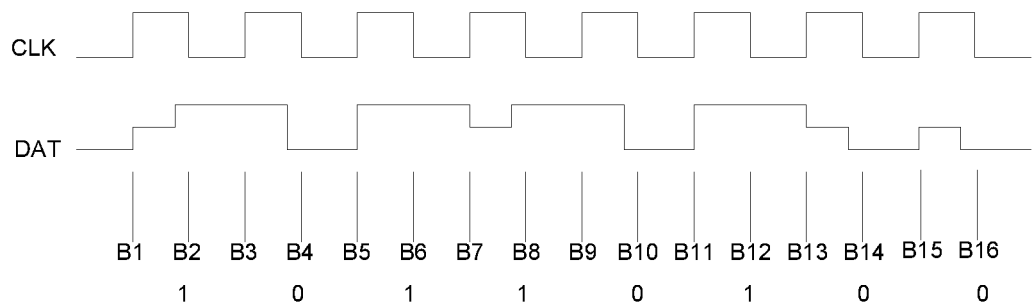
FIG. 6 shows a procedure diagram in which the chip transmits data to the imaging device according to another embodiment of the present disclosure.

The present disclosure can surely have other embodiments. FIG. 6 shows the communication method between the chip and the imaging device according to another embodiment of the present disclosure. As indicated in FIG. 6, the master data are transmitted in the data line DAT in the form of high- and low-level voltages, wherein the high-level voltage corresponds to the binary number "1," while the low-level voltage corresponds to the binary number "0." And the implicit data are transmitted in the data line DAT in the form of high- and mid-level voltages, wherein the high-level voltage corresponds to the binary number "1," while the mid-level voltage corresponds to the binary number "0." Herein, the high-level voltage is approximately 3.3

V, and the low-level voltage substantially equals the grounding voltage. The mid-level voltage, which is higher than the low-level voltage and lower than the high-level voltage, can be in the range from 1 V to 2 V, preferably 1.5 V, and is of course not limited hereto. In the embodiment as shown in FIG. 6, the chip transmits data to the imaging device in exactly the same way as explained in the above embodiment. In the time points indicated from B1 to B16, the voltages of the data line DAT alternately represent the implicit data and the master data. The mere difference of the present embodiment is that the voltage in representation of the implicit datum "0" is no longer the ground voltage, but rather a substantial 1.5 V mid-level voltage. Therefore the data transmission procedure will not be repeated herein.

In a conventional communication procedure between the imaging device and the chip, it is only necessary for the imaging device to read the master data while the implicit data do not need to be read thereby. Where it is necessary to read the implicit data in the chip, as in the present disclosure, the imaging device can use an information reading device having a function of reading the implicit data to obtain the implicit data in the chip. The information reading device can comprise an internal clock module, an information collecting module, and a communication interface. The internal clock module can be used to control information collection of the information reading device. When it is necessary to read the implicit data in the chip, the communication interface will be connected to the bus.

Figure 7:
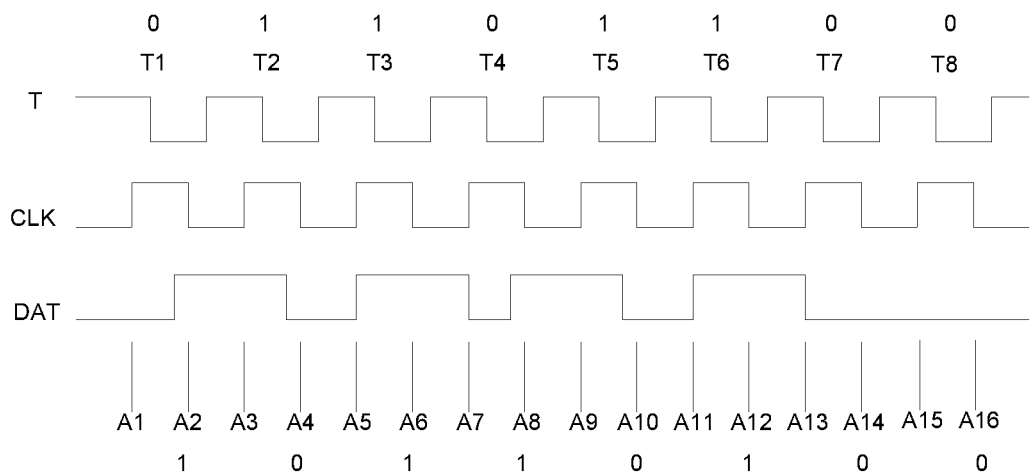
FIG. 7 shows a procedure diagram in which an information reading device is used to read implicit data according to the embodiment as shown in FIG. 4.

FIG. 7 shows a procedure diagram in which the information reading device is used to read the implicit data according to the embodiment as shown in FIG. 4. A periodical signal T of the internal clock module in the information reading device can control time points at which the information collecting module reads data from the data line DAT, wherein the time points should be controlled within a time slot when the chip is transmitting the implicit data. In the embodiment, the time points for data reading are preferably arranged at clock falling edges of the periodical signal T as shown in FIG. 6. When it arrives at point T1, the information collecting module will read data from the data line DAT, to obtain the implicit datum "0;" when it arrives at point T2, the information collecting module will read data from the data line DAT, to obtain the implicit datum "1;" and when it arrives at point T3, the information collecting module will read data from the data line DAT, to obtain the implicit datum "1;" so on and so forth. Whenever it arrives a clock falling edge of the periodical signal T, the information collecting module will read a datum from the data line DAT, until the implicit data are completely read.

Figure 8:
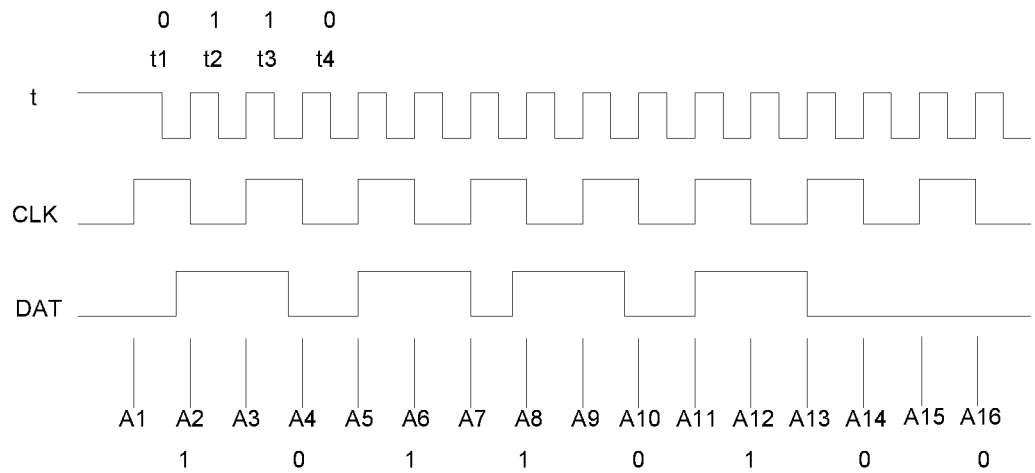
FIG. 8 shows a procedure diagram in which the information reading device is used to read both implicit data and master data according to the embodiment as shown in FIG. 4.

Similarly, besides the function of reading the implicit data, the information reading device can have a function of reading the master data meanwhile. FIG. 8 shows a procedure diagram in which the information reading device is used to read both the implicit data and the master data according to the embodiment as shown in FIG. 4. A periodical signal t of the internal clock module in the information reading device can control time points at which the information collecting module reads data from the data line DAT, wherein the time points are distributed among both the time slots in which the chip is transmitting the implicit data and the time slots in which the chip is transmitting the master data. In the present embodiment, the time points for data reading are preferably arranged at clock falling edges of the periodical signal t as shown in FIG. 7. When it arrives at point t1, the information collecting module will read data from the data line DAT, to obtain the implicit datum "0;" when it arrives at point t2, the information collecting module will read data from the data line DAT, to obtain the master datum "1;" when it arrives at point t3, the information collecting module will read data from the data line DAT, to obtain the implicit datum "1;" and when it arrives at point t4, the information collecting module will read data from the data line DAT, to obtain the master datum "0;" so on and so forth. Whenever it arrives a clock falling edge of the periodical signal t, the information collecting module will read a datum from the data line DAT, so as to collect the implicit data and the master data alternately.

Since the clock pulse signals for communication between the imaging device and the chip are fixed, the above periodical signal T or t can be rather readily determined.

In the above embodiment, the information reading device is an independent device separate from the imaging device. An imaging device having no function of reading the implicit data of the chip can be added with the information reading device on the bus for reading the implicit data of the chip. The information reading device can record the implicit data of the chip by collecting data from the bus as per periodic signals set forth thereby, which will not affect communication between the imaging device and the chip. This does not need any special READ or WRITE instructions, thereby ensuring data transmission efficiency of the chip.

The above information reading device can of course be arranged in the imaging device, so as to enable the imaging device with a function of reading the implicit data. When it is necessary to read the implicit data stored in the chip, the imaging device will activate the information reading device arranged therein to read the implicit data from the data line. Specific data collection can be performed in the same steps as illustrated above in which the information reading device collects the implicit data. These steps will not be repeated herein. In the above embodiment, when the imaging device sends the READ instruction, the chip transmits, within one clock pulse signal period, one bit of the implicit data and one bit of the master data stored therein to the data line in different time slots. In another embodiment, the chip can also transmit, within one clock pulse signal period, two or more bits of the implicit data and one bit of the master data stored therein to the data line in different time slots. Generally, one clock pulse signal period of the imaging device is in the range from 1000 ns to 20 us, while a pulse duration of one implicit datum can be controlled within the range from 100 ns to 1000 ns. For example, theoretically, for an imaging device having a clock pulse signal period within 1000 ns, the chip can, within one clock pulse signal period, transmit four bits of the implicit data (the pulse duration of the implicit data is controlled within 100 ns) and one bit of the master data stored therein to the data line in different time slots, respectively. When the chip is transmitting data to the imaging device, it is only necessary to guarantee that the imaging device will be collecting data from the data line during the time slots when the chip is transmitting the master data to the data line. Likewise, when the information reading device is used to read the implicit data from the chip, it is only necessary to enable the information reading device to collect data from the data line as per a predetermined period during the time slots when the chip is transmitting the implicit data to the data line.

In the above, the steps are explained in which the chip, as per the READ instruction from the imaging device, transmits the implicit data and the master data to the imaging device, and the imaging device reads the master data only, or alternatively reads both the master data and the implicit data. When the chip receives the WRITE instruction from the imaging device, the chip will update the implicit data stored in the memory, receive the master data from the imaging device, and write the master data into the memory, wherein the update step can be performed either before or after the WRITE step. In the embodiments of the present disclosure, the implicit data usually involve the information of the chip, and are therefore of significant importance to inspection and malfunction elimination of the chip. As a result, preferably, the chip control unit can first update the implicit data stored in the memory, and then write the master data into the memory. The approaches for updating of the implicit data can be correspondingly adjusted as per differences in types of the data, which will not be limited herein. For example, as per the types of the implicit data, the following updating approaches can be used.

When the implicit data refer to the anti-counterfeit information or manufacturing information of the chip, after the chip receives the WRITE instruction from the imaging device, the control unit of the chip will first update the implicit data stored in the memory, and then write the master data from the imaging device into the memory, wherein updated implicit data will be the same as the previous implicit data. Of course, the implicit data may not be updated, in which case, the master data from the imaging device are directly written into the memory.

When the implicit data refer to the parameters of working environment of the chip, after the chip receives the WRITE instruction from the imaging device, the control unit of the chip will first detect the working environment of the chip, such as temperature, humidity, and power voltage, then update the implicit data stored in the memory in accordance with new parameters of working environment, and then write the master data from the imaging device into the memory.

When the implicit data refer to the usage states of the chip, such as at least one selected from a group consisting of parameter values of WRITE times, normal communication times, READ times, communication failure times, and communication interference times, after the chip receives the WRITE instruction from the imaging device, the control unit of the chip will update the implicit data stored in the memory by adding one thereto, and then write the master data received from the imaging device into a corresponding memory.

The control unit of the chip above can of course alternately update the implicit data and write the master data by bits. In other words, there can be a plurality of specific embodiments, which are not limited hereto.

In addition, the present disclosure further provides an imaging cartridge, which is provided with the chip of the present disclosure.

Through the chip, the imaging cartridge, and the communication method between the chip and the imaging device of the present disclosure, the function of transmission of the implicit data and the master data in one and a same data line can be achieved. Besides, in the communication procedure between the chip and the imaging device, the imaging device can read the master data solely, or alternatively, where necessary, read the implicit data also, by means of the information reading device having the function of reading the implicit data, during the time slots when the chip is transmitting the implicit data. This can ensure data transmission efficiency, thereby ensuring both imaging operation efficiency of the imaging device, and data security of the implicit data.

Thus, the present disclosure describes a chip, an imaging cartridge, and a communication method between the chip and the imaging device. The chip is stored with implicit data and master data. The communication method comprises the following steps. The chip receives a clock pulse signal and a READ instruction from the imaging device, wherein within one clock pulse signal period, the chip transmits at least one bit of implicit data and one bit of master data to the data line within different time slots, respectively, and the imaging device reads data from the data line while the chip is transmitting the master data. And the chip receives a WRITE instruction from the imaging device, writes the master data received from the imaging device into a memory, and updates the implicit data stored in the memory. The implicit data and the master data can be transmitted in one and a same data line. The imaging device can read the master data only, or can read the implicit data also, by means of an information reading device having a function of reading implicit data, while the chip is transmitting the implicit data, thereby ensuring both data transmission efficiency and data security of the implicit data.

The above description should not be construed as limitations of the present disclosure, but merely as exemplifications of preferred embodiments thereof. Any variations or replacements that can be readily envisioned by those skilled in the art are intended to be within the scope of the present disclosure. Hence, the scope of the present disclosure should be subject to the scope defined in the claims.

The invention claimed is:

1. A communication method between a chip and an imaging device, comprising the steps of:
   receiving, by the chip, a clock pulse signal from the imaging device via a clock line;
   receiving, by the chip, a READ instruction from the imaging device via a data line, wherein within one clock pulse signal period, the chip transmits at least one bit of implicit data and one bit of master data that are stored in an internal memory to the data line within different time slots, respectively, and the imaging device collects data from the data line while the chip is transmitting master data to the data line, wherein implicit data refers to record information relevant to the chip, the implicit data is stored and updated by the chip, rather than being written in by the imaging device, and the master data refers to information relevant to an imaging cartridge and an aging procedure of the imaging device; and
   receiving, by the chip, a WRITE instruction from the imaging device via the data line, wherein the chip receives the master data sent from the imaging device, writes the master data into the memory arranged in the chip, and updates the implicit data stored in the memory.

2. The communication method according to claim 1, wherein:
   after a rising edge of the clock pulse signal arrives, the chip transmits the at least one bit of implicit data to the data line, and before a falling edge of the clock pulse signal arrives, the chip stops transmission of the implicit data, and turns to transmit the one bit of master data to the data line; and
   when the falling edge of the clock pulse signal arrives, the imaging device collects data from the data line.

3. The communication method according to claim 1, wherein:
   after the falling edge of the clock pulse signal arrives, the chip transmits the at least one bit of implicit data to the data line, and before the rising edge of the dock pulse signal arrives, the chip stops transmission of the implicit data, and turns to transmit the one bit of master data to the data line; and when the rising edge of the clock pulse signal arrives, the imaging device collects data from the data line.

4. The communication method according to claim 1, wherein the imaging device further collects data from the data line in the time slot when the chip is transmitting the implicit data to the data line.

5. The communication method according to claim 1, wherein the implicit data comprises at least one piece of information selected from a group including parameters of anti-counterfeit information of the chip, manufacturing information of the chip, WRITE times of the chip, restoration times of the chip, normal communication times of the chip, READ times of the chip, communication failure times of the chip, communication interference times of the chip, and working environment of the chip.

6. The communication method according to claim 5, wherein when receiving the WRITE instruction from the imaging device via the data line, the chip first updates the implicit data stored in the memory, and then writes the master data received from the imaging device into the memory.

7. The communication method according to claim 1, wherein:
the master data are transmitted to the data line in forms of a high-level voltage and a low-level voltage, respectively; and
the implicit data are transmitted to the data line in the forms of a high-level voltage and a low-level voltage, respectively, or alternatively in the forms of a high-level voltage and a mid-level voltage, respectively, and wherein the mid-level voltage is lower than the high-level voltage and higher than the low-level voltage.

8. A chip for performing data transmission between the chip and an imaging device coupled with the chip, comprising:
a memory used for storing implicit data and master data, wherein implicit data refers to record information relevant to the chip, the implicit data is stored and updated by the chip, rather than being written in by the imaging device, and the master data refers to information relevant to an imaging cartridge and an imaging procedure of the imaging device; and
a control unit used for connecting the imaging device via a bus and transmitting data to the bus,
wherein,
controlled by the control unit, the chip receives a clock pulse signal and a READ instruction from the imaging device via the bus, and transmits, within one clock pulse signal period, at least one bit of implicit data and one bit of master data that are stored in the memory to the bus in different time slots, respectively, and wherein the control unit is provided with a timing module therein, under the control of, the chip transmits the master data to the bus while the imaging device is collecting data from the bus.

9. The chip according to claim 8, wherein:
after a rising edge of the clock pulse signal arrives, the chip transmits the at least one bit of implicit data to a data line of the bus, and before a falling edge of the clock pulse signal arrives, the chip stops transmission of the implicit data, and turns to transmit the one bit of master data to the data line; and
when the falling edge of the clock pulse signal arrives, the imaging device collects data from the data line.

10. The chip according to claim 8, wherein:
after the falling edge of the clock pulse signal arrives, the chip transmits the at least one bit of implicit data to a data line of the bus, and before the rising edge of the clock pulse signal arrives, the chip stops transmission of the implicit data, and turns to transmit the one bit of master data to the data line; and
when the rising edge of the clock pulse signal arrives, the imaging device collects data from the data line.

11. The chip according to claim 8, wherein the imaging device further collects data from the bus in the time slot when the chip is transmitting the implicit data to the bus.

12. The chip according to claim 8, wherein the implicit data comprises at least one piece of information selected from a group including parameters of anti-counterfeit information of the chip, manufacturing information of the chip, WRITE times of the chip, restoration times of the chip, normal communication times of the chip, READ times of the chip, communication failure times of the chip, communication interference times of the chip, and working environment of the chip.

13. The chip according to claim 12, wherein when receiving the WRITE instruction from the imaging device via the bus, the chip first updates the implicit data stored in the memory, and then writes the master data received from the imaging device into the memory.

14. The chip according to claim 8, wherein:
the master data are transmitted to a data line of the bus in forms of a high-level voltage and a low-level voltage, respectively; and
the implicit data are transmitted to the data line in the forms of a high-level voltage and a low-level voltage, respectively, or alternatively in the forms of a high-level voltage and a mid-level voltage, respectively, and wherein the mid-level voltage is lower than the high-level voltage and higher than the low-level voltage.

15. An imaging cartridge, wherein the imaging cartridge is provided thereon with the chip according to claim 8.

* * * * *